July 10, 1951

H. W. HAPMAN 2,559,614

APPARATUS FOR CONDITIONING, CLEANING, AND CIRCULATING COOLING LIQUIDS

Filed Oct. 12, 1944

Inventor
Henry W. Hapman
By Barthel & Bugbee
Attorneys

July 10, 1951

H. W. HAPMAN

2,559,614

APPARATUS FOR CONDITIONING, CLEANING,
AND CIRCULATING COOLING LIQUIDS

Filed Oct. 12, 1944

Inventor
Henry W. Hapman
By
Barthel & Bugbee
Attorneys

UNITED STATES PATENT OFFICE 2,559,614

APPARATUS FOR CONDITIONING, CLEANING, AND CIRCULATING COOLING LIQUIDS

Henry W. Hapman, Detroit, Mich., assignor of forty per cent to Hannah J. Hapman, Detroit, Mich.

Application October 12, 1944, Serial No. 558,424

3 Claims. (Cl. 210—55)

The present invention relates to improvements in coolant tanks, and more particularly, to a sludge removing and filtering apparatus therefor.

The primary object of the invention is to provide a coolant and sludge tank in which the coolant liquid is circulated therethrough in such a manner as to be freed from foreign particles and to provide means for removing said particles and filtering the coolant liquid to purify the same for recirculation to the source of use.

Another object of the invention is to provide a coolant tank and sludge remover which is provided with a filter element capable of being readily removed for the purpose of cleaning, repair and reconditioning so as to restore the filter element to its initial cleanliness at various intervals during the use of the coolant tank.

Another object of the invention is to provide a combined coolant tank and filter assembly in which the coolant liquid is circulated through the coolant tank so that the heavier particles of foreign matter and dirt therein will gravitate to the bottom of the tank where they are removed by a conveyor type sludge remover and the remaining particles will be removed by the filtering element.

Another object of the invention is to provide a coolant and sludge tank having a filtering assembly which is unique in construction, economical to manufacture and efficient in operation and embodies a series of filtering elements so arranged as to permit passage of the cooling liquid from the external surfaces of said filtering element internally thereof, whereby foreign matter and particles may be dislodged from said filtering element without necessitating dismantling or removal thereof from the coolant tank.

Another object of the invention is to provide a coolant and sludge tank having a sludge conveyor and a series of filtering elements arranged to swing on a horizontal axis to permit frequent cleaning and inspection from time to time without removing the filtering elements independently and to provide means for removing foreign matter and particles from the filtering elements.

Another object of the invention is to provide a coolant tank and sludge collection system for accommodating a large number of machine tools in order to collect the coolant liquid and sludge therefrom after being used to cool the machine and work so that said coolant liquid and sludge may be conveyed to the coolant tank for purification, separation and recirculation.

Another object of the invention is to provide a sludge collection system for a series of machine tools in which the coolant liquid is applied thereto by means of pressure feed from the coolant tank and returned to the tank by gravity and conveyor means to insure the proper cleaning of the circulatory system and the collection and separation of sludge and other foreign matter from the coolant liquid.

Another object of the invention is to provide a coolant tank for accommodating a large number of machine tools in which the coolant liquid is collected in the tank and filtered before being returned to the system in such a manner as to free the coolant liquid of all impurities and foreign matter and convey said foreign matter to a remote point externally of the tank for disposal.

Another object of the invention is to provide a system for coolant liquids used or employed for cooling various machine tools and the like in which the means for conveying the liquid and sludge to the coolant tank consists of an endless conveyor trained over sprockets or pulleys and arranged in a conduit in such a manner as to remove all of the sediment and sludge from the conduit and convey the same to the coolant tank.

Another object of the invention is to provide an endless conveyor for the collection system and coolant tank which is constructed of flight members of a suitable shape to conform to the shape of the conduit employed and which is formed of sectional flight members having a flexible rubber or fiber packing adapted to be attached or affixed to the conveyor chain so that the packing will engage the walls of the conduit and remove sludge therefrom without becoming unduly worn or disintegrated through excessive use.

Another object of the invention is to provide a filter element particularly adapted for use in the settling tank of a coolant liquid circulating system which is constructed of spaced apart frame members to which is anchored or affixed the reticulate filter member in such a manner as to increase the filtering capacity of the filter element and insure the proper cleansing of the coolant liquid and the separation and filtering of foreign particles therefrom.

Another object of the invention is to provide a coolant and sludge tank for coolant liquids of the above-mentioned character in which the coolant liquids may be circulated in a direction to remove sediment and foreign matter from the filtering elements and may be forced to the machine tool under pressure in its other direction of circulation, thereby enabling the filtering elements to be cleaned and reconditioned periodically without necessitating their removal or the cessation of machine operation during repair or cleaning thereof.

Another object of the invention is to provide a coolant liquid and sludge tank which is uniquely constructed and is provided with a conveyor conduit or passageway for directing the travel of the sludge removal conveyor element to insure the removal of sludge and other foreign matter from the cooling liquid in a most economical, novel and efficient manner.

Other objects and advantages will become apparent during the following description of the accompanying drawings, wherein:

Figure 6 is a fragmentary top plan view of a modified form of the invention further illustrating the coolant tank with a slightly different arrangement of filtering elements therefor;

In the drawings, attention is first directed to Figures 1 to 5, inclusive, 13 and 14, wherein there is shown a preferred embodiment of the invention and wherein the reference character 5 will generally be employed to designate a coolant tank including side walls 6 and 7 connected by end walls 8 and 9. A bottom wall 10 connects the side and end walls 6, 7, 8 and 9 and said bottom wall is formed with a dropped bottom portion having sloping wall portions 11. The sloping wall portions 11 converge as at 13 in a trough-shaped bottom and vertical trough walls 14 and 15 are provided at each end thereof for connection with the partial bottom wall 10. The portion of the bottom wall as at 16 is inclined to facilitate the guiding and feeding of material to the coolant tank when the same is discharged from the machine tool in which it is used.

Mounted adjacent each end of the coolant tank 5 is a bracket foot member 17 having a V-shaped cradle portion 18 for receiving the trough-shaped bottom so as to securely support the same upon a suitable floor or other supporting surface.

Figure 1:
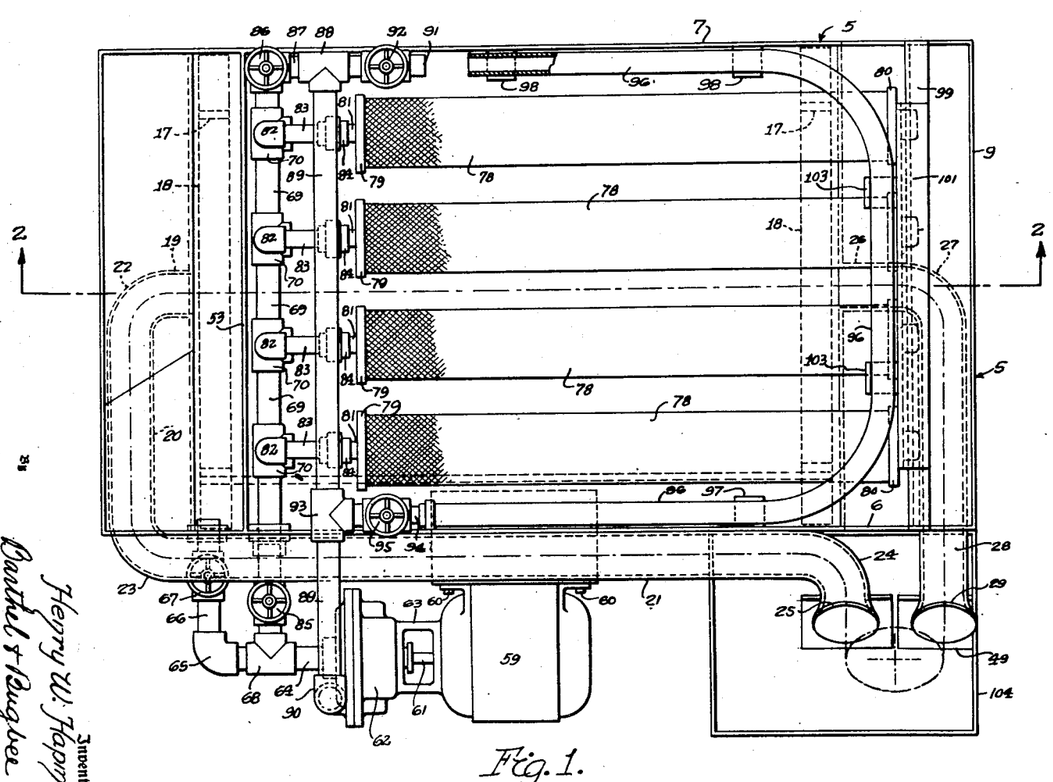
Figure 1 is a top plan view of a preferred embodiment of the invention illustrating in detail the arrangement of the filtering elements and the general assembly of the coolant tank and circulating system therefor.

Secured to the end wall 14 of the dropped bottom is a conveyor conduit 19 having an inclined portion 20 and a horizontally disposed portion 21 connected by suitable elbow portions 22 and 23. The end of the horizontal tubular conduit 21 is formed with an elbow portion 24 and terminates in an outwardly flared bell-mouth portion 25 (Figure 1). Similarly, a conveyor conduit 26 is secured to the dropped bottom end wall 15 and said conduit is bent as at 27 to form an elbow portion and extends upwardly at an oblique angle in a relatively spaced portion 28. The upper free end of the relatively spaced portion 28 is outwardly flared as at 29 and terminates in juxtaposed relation to the outwardly flared portion 25 of the conveyor conduit 21.

Figures 3, 4:
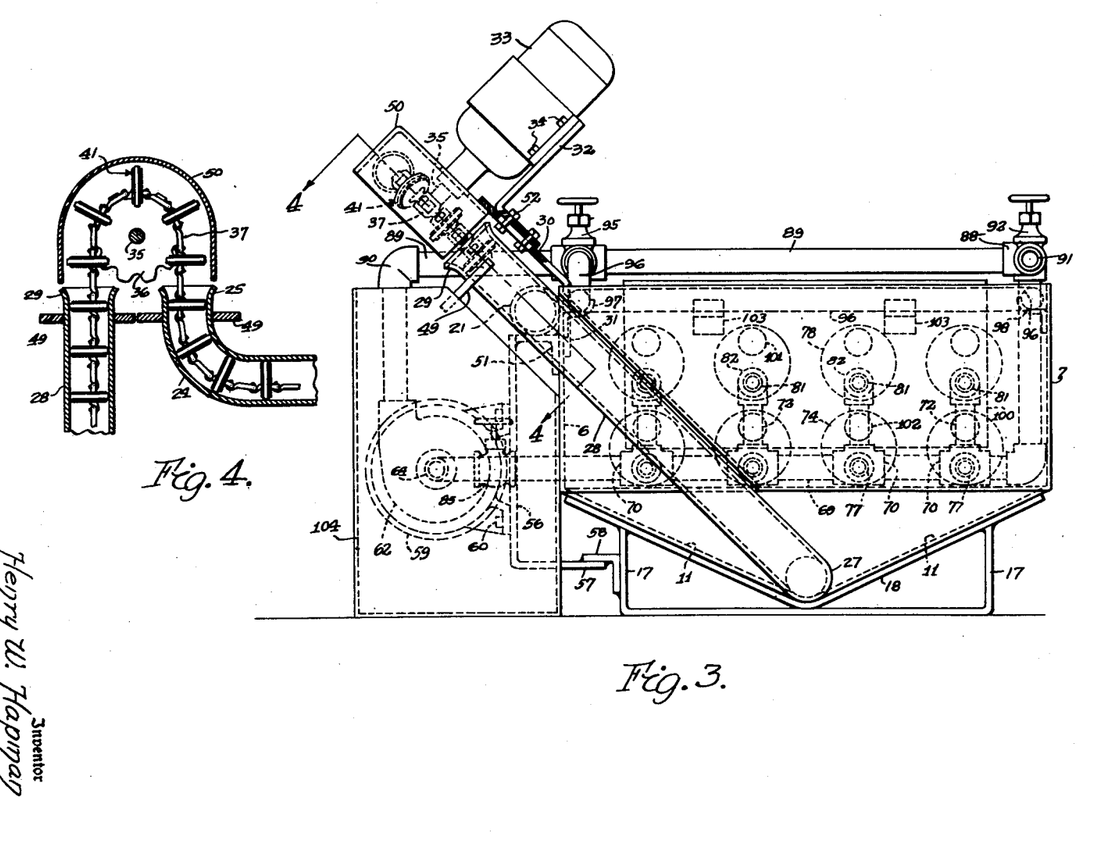
Figure 3 is an end elevational view of the coolant and sludge tank showing portions thereof broken away to illustrate various details of construction.
Figure 4 is an oblique cross-sectional view taken on the diagonal line 4—4 of Figure 3, looking in the direction of the arrows and showing the manner in which the sludge removal conveyor is adapted to be driven by a single sprocket.

Secured to the side wall 6 of the coolant tank and mounted adjacent one end thereof is a bracket arm 30 (Figure 3) having its lower end as at 31 welded or otherwise secured in place, and said bracket arm 30 has its free end secured to an angle bracket 32 which forms a support for an electric motor 33. The electric motor is held in place by suitable machine screws or the like as at 34. The armature shaft of the motor 33 as at 35 is disposed obliquely and has affixed or keyed thereto a sprocket wheel or the like as at 36 (Figure 4). Mounted within the tubular conveyor passageway formed by the conveyor tubes 19, 20, 21, 26 and 28 is an endless sprocket chain composed of a series of chain links 37 having one end formed with a bar portion 38 and the opposite end provided with a hooked portion 39 for receiving said bar portion 38 so that the space between the chain links 37 will provide a sprocket tooth receiving opening of a slightly larger size than the teeth on the sprocket wheel 36. Alternate chain links 37 are provided with laterally extending arm portions 40 (Figures 13 and 14) which arm portions may be formed integral with the chain links or may be attached thereto in any suitable manner. Secured to the laterally extending arm portions 40 of the chain links 37 is a series of conveyor flights generally indicated by the reference character 41. Each conveyor flight 41 is formed of a pair of pressed metal stampings 42 which are adapted to be secured together and to the laterally extending wing portions 40 by rivets or the like 43 being passed through suitable openings 44 in the laterally extending wing portions 40 which are aligned with openings 45 in the pressed-metal stampings 42. The peripheral edge of each stamping 42 is flanged as at 46 to provide a space therebetween for receiving a natural or synthetic rubber insert 47 which is adapted to withstand considerable wear during the handling of abrasive material or particles deposited in the cooling liquid. In forming the flight members, it has been found that rubber scrapers composed of Buna-n, Thiokol or neoprene synthetic types are preferable since they offer high resistance to petroleums, oils and abrasions. Each of the conveyor flights 41 is cut away as at 48 to form a recess or passageway for permitting the travel of said flights over the sprocket wheel 36 during their passage thereabout.

Mounted on the free ends of the conveyor conduits 24 and 28 and spaced from the flared portions 25 and 29 thereof is a guard plate 49 (Figures 3 and 5) to prevent the material being discharged along with the sludge from passing downwardly along the outer surface of said flared portions 25 and 29. A guard housing 50 is secured to the bracket arm 30 to conceal the sprocket 36 and conveyor flights as they traverse said sprocket so as to prevent material adhering thereto from being thrown by centrifugal action on objects adjacent the coolant tank. It is to be noted that the intermediate portion of the conveyor tube 21 is supported by an angle bracket 51 secured in place to the side wall 6 of the coolant tank as by means of welding or the like and, if desired, the conveyor tube 21 may be anchored by welding at the point of contact to said angle bracket and thereby form a rigid structure. When it is desired to adjust the tension of the endless conveyor, or when the sprocket chain 37 becomes worn, the adjusting nuts 52 may be manipulated so as to permit movement of the angle bracket 32 and motor 33 to a new position of adjustment for taking up said wear or slack in the conveyor chain.

Coolant liquid from the machine tool is fed to the coolant tank adjacent one end thereof on one side of a vertical partition wall 53 (Figure 2) which extends between the side walls 6 and 7 and has its ends connected thereto by welding or the like and its lowermost end angularly bent as at 54 to form a small shelf or supporting foot. The partition wall 53 thus provides a deposit or collection chamber 55 having a sloping bottom wall 16 which converges toward the partition wall 53 and terminates a short distance therefrom so as to form a restricted passageway between the collection chamber 55 and the coolant tank including the dropped bottom portion having the converging bottom walls 11.

Mounted on the angle bracket 51 is a motor supporting plate 56 which has one end welded to the angle bracket and its opposite end bent to provide a foot portion 57 for being welded or otherwise secured to an angle bracket 58 attached to the supporting bracket 17 (Figure 3). Mounted on the motor supporting plate 56 is an electric motor 59 which is fastened in place by bolts or the like 60 and said motor is provided with an armature shaft 61 for driving a circulating pump 62 (Figure 1). The pump 62 is secured to the motor frame by means of a suitable bracket 63. While a centrifugal pump has been illustrated in the drawing, it is to be understood that the form of pump may be optional and that any desired type may be successfully employed in the circulating system for the coolant tank about to be described. The inlet 64 of the pump 62 is provided with an elbow fitting 65 and a short length of pipe 66 which extends into and communicates with the interior of the coolant tank adjacent the bottom thereof for the purpose of circulating the liquid directly from the tank. A control valve 67 is interposed in the pipe section 66 to close the passageway therethrough when it is desired to circulate coolant liquid through a system of filter elements mounted within the tank.

Figures 2, 7, 8:
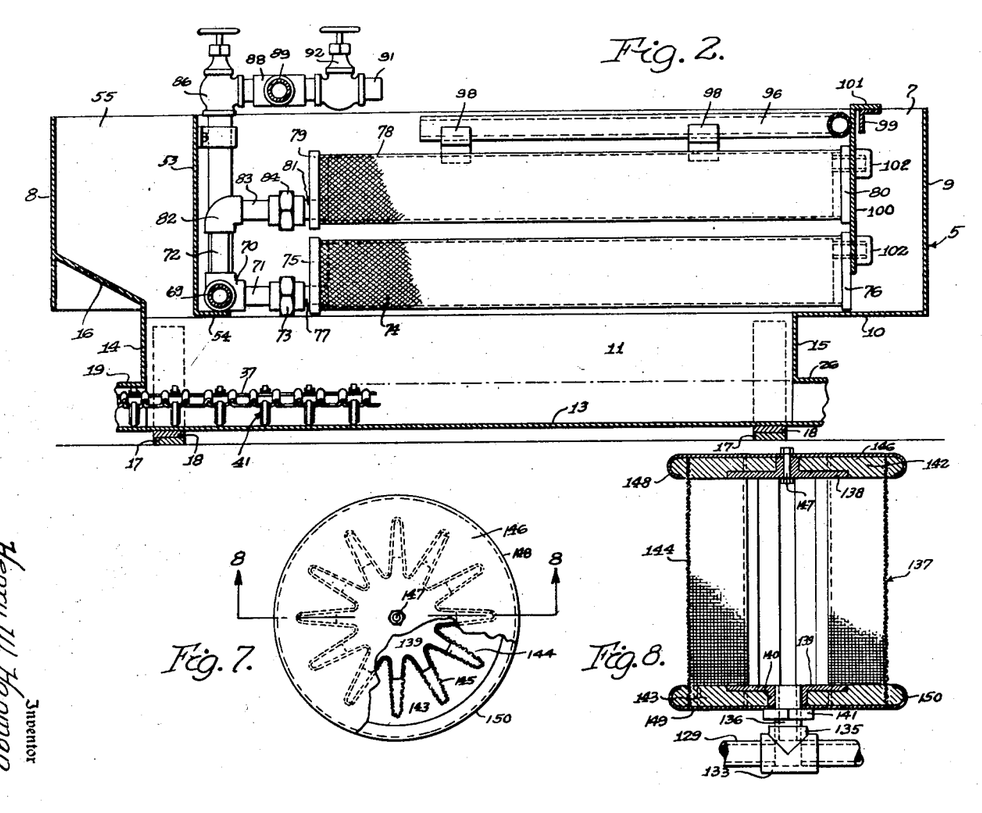
Figure 2 is a longitudinal sectional view taken on line 2—2 in Figure 1 looking in the direction of the arrows showing various structural details including the arrangement for permitting the vertical swinging movement of the filter element to facilitate the cleaning thereof.
Figure 7 is a top plan view of one of the filtering elements showing the modified form of the invention having a portion broken away to illustrate the various details of construction.
Figure 8 is a vertical sectional view taken on line 8—8 of Figure 7, further showing the filtering element and the manner in which the same is constructed.

Also secured to the inlet pipe 64 of the rotary pump 62 is a pipe fitting 68 to which is connected a manifold pipe 69 which projects into the coolant tank and extends transversely thereof. The manifold pipe 69 terminates adjacent the side wall 7 of the coolant tank and may be affixed thereto in any suitable manner. Interposed in the manifold pipe 69 is a series of equidistantly spaced pipe fittings 70 for receiving short sections of pipe as at 71 and 72. The short pipe section 71 is connected by a pipe coupling or the like 73 to an elongated cylindrical filtering element 74 having end caps 75 and 76 secured to the reticulated screening forming the filtering element 74 (Figure 2). The short pipe section 77 may be threaded in the end cap 75 in any suitable fashion with its outer end received in the pipe coupling or union 73 so as to establish fluid communication between the interior of the filtering element 74 and the intake of the pump 62. Similarly, a series of filtering elements of elongated tubular form as at 78 are mounted above the series of tubular filtering elements 74 and said filtering elements are provided with end caps 79 and 80, one of which as at 79 is provided with a short section of pipe 81 for connection to the short section of pipe 72 by means of an elbow joint 82, short pipe section 83 and pipe coupling or union 84. A control valve 85 is interposed between the pipe manifold 69 and pipe fitting 68 (Figure 1), and a control valve 86 is secured to the free end of the manifold pipe by means of a suitable elbow connection and vertical pipe section connected therebetween, and is provided with a short pipe section 87 connected to a T-joint 88 having a return pipe 89 connected thereto for connection with the outlet or exhaust 90 of the rotary pump 62. The T-fitting 88 is provided with a discharge pipe 91 having a control valve 92 for closing the passage of liquid therethrough as shown in Figure 1. Also interposed in the return pipe 89 is a key fitting 93 having a short discharge pipe 94 in which there is interposed a control valve 95, and affixed to the free end of the pipe 94 is a rubber hose section 96 which is adapted to be supported within the coolant tank by means of suitable supporting brackets 97 and 98 secured to the side walls 6 and 7 respectively of the coolant tank. Extending between the side walls 6 and 7 at the opposite end of the coolant tank is an angle bracket 99, and said angle bracket may have its ends welded or otherwise secured in place, and may be disposed to form a support for a filter supporting plate 100 (Figure 2) which has its upper end flanged as at 101 for resting upon the angle bracket 99. The threaded nipples on the other ends of the filtering elements 74 and 78 may pass through suitable openings in the filtering element supporting plate 100 so that cap nuts 102 may be threaded thereon to securely hold said filtering elements in place. Hook clips 103 are secured to the filter supporting plate 100 to additionally support the flexible rubber hose 96 adjacent one end of the coolant tank.

Figures 5, 11, 12, 13, 14:
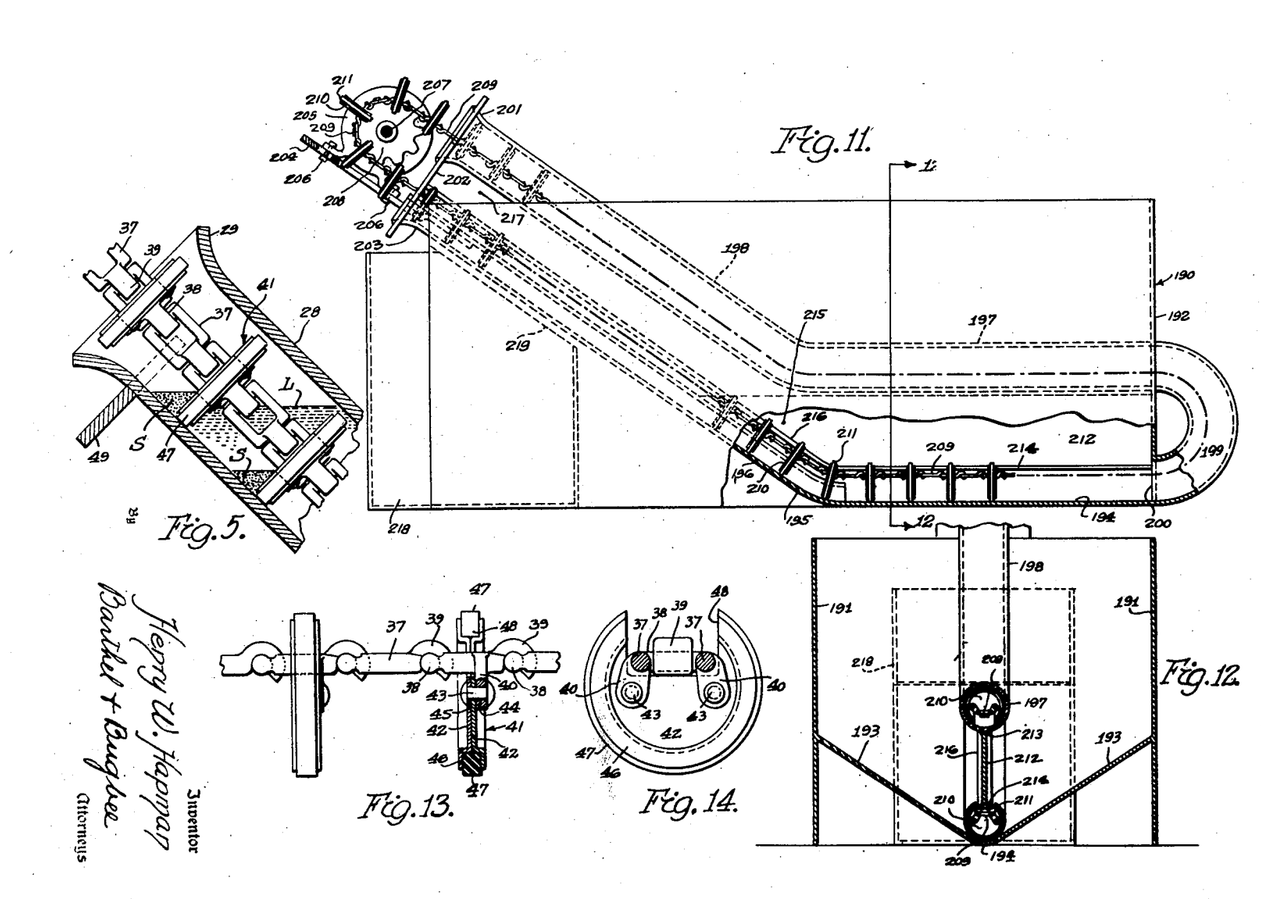
Figure 5 is a vertical sectional view of one of the conveyor conduits illustrating the manner in which the sludge and other foreign matter is removed from the coolant tank by the endless conveyor.
Figure 11 is a side elevational view of a still further modified form of the invention illustrating portions thereof broken away to show various details of construction and the arrangement of the sludge removal conveyor.
Figure 12 is a vertical cross-sectional view taken on line 12—12 of Figure 11 looking in the direction of the arrows and illustrating the manner in which the sludge removal conveyor is guided throughout its circuitous path.
Figure 13 is a side elevational view of the sludge conveyor employed in all forms of the invention showing a portion of one of the flights broken away to illustrate the structural details thereof.
Figure 14 is a transverse cross-sectional view of the conveyor showing the manner in which the flight members are cut away to facilitate the passage thereof over the drive sprocket.

A collection receptacle 104 is disposed beneath the free ends of the conveyor conduits for collecting the sludge discharged from the coolant tank by the endless conveyor during the operation thereof. The endless conveyor may operate in either direction of rotation, but as shown in Figure 5, the conveyor conduit 28 is shown as forming the discharge passageway so that sludge S may be carried upwardly therein and discharged from the flared end 29 of said conduit whereby said sludge will fall into the collection chamber 104. The liquid level L of the coolant liquid is indicated in Figure 5, which permits the use of a large quantity of coolant liquid with better settling and separation characteristics so as to completely remove all foreign particles from the coolant liquid before the same is returned to the machine tool upon which the liquid is used. The openings 48 in the conveyor flights 41 permit the liquid or coolant material to drain back as shown in Figure 5 and remove the sludge S above the liquid level while said cooling liquid is draining therefrom. When the sludge finally reaches the top or discharge opening 29, the major portion of the liquid contents has been removed therefrom so as to prevent the waste of said coolant liquid and eliminate the necessity of replenishing the contents of the tank periodically.

In operation, the coolant tank shown in Figures 1 to 5, inclusive, 13 and 14, when it is desired to circulate and separate foreign matter from the coolant liquid employed in a machine tool, is placed adjacent the machine tool with a collection chamber 55 disposed beneath the discharge of the machine tool so that the coolant liquid therefrom will drain into said coolant tank. After the coolant tank has thus been disposed adjacent the machine tool as above described, the motor 33 is started to cause the endless conveyor to travel at a relatively slow rate of speed so as to continuously move sludge and sediment collected along the bottom of the coolant tank or along the conveyor path as at 13. With the endless conveyor in operation, the motor 59 is next operated to cause the rotor within the pump 62 to rotate so as to circulate the coolant liquid through the pump.

Normally, the pipe section 91 is connected to the coolant supply jet disposed adjacent the machine tool so as to spray coolant liquid on the work and material while being operated on and when said pipe section 91 is thus connected, the valve 67 is closed and the valve 85 opened so that the coolant liquid in the tank will pass through the filter elements 74 and 78 and thence through the pipes 71 and 83 to the manifold pipe 69. The coolant liquid is then conducted to the rotary pump 62 through the short pipe section 64, and is exhausted through the discharge pipe 89 to the pipe section 91. During the operation of the coolant tank in this manner, the valves 86 and 95 are closed and the valve 92 is opened to permit free passage of the coolant liquid to the spray jet (not shown) of the machine tool.

When it is desired to clean the filter elements 74 and 78 and remove foreign material from the external surfaces thereof, the valve 92 must be closed and the valve 95 opened so as to cause the coolant liquid to be passed through the flexible rubber conduit or pipe 96 which may be manually manipulated to present the end thereof to the filtering element so as to forcibly remove said sediment or foreign matter from the external surfaces of the filtering element. The foreign matter or sediment may be washed from the external surfaces of the filtering element as above described by the use of a rubber flexible hose 96, or, if desired, the circulation through the filtering element may be reversed by manipulating the control valve so as to connect the discharge pipe 89 with the manifold 69 by simply closing the valves 92, 95 and 85 and opening the valve 86. It will be seen that when the valves are thus controlled, fluid flow from the tank to the pump 62 will be through the pipe 89, manifold 69, filtering elements 74 and 78 and thence back to the pump 62 through the pipe 66, the valve 67 having been opened upon the closing of the valves 85, 92 and 95 and the opening of the valve 86. The coolant liquid will be circulated in the reverse order so as to remove foreign matter and sediment from between the interstices of the fabric or screening of the filtering elements so that said foreign matter will fall by gravity to the bottom of the coolant tank to be collected and discharged by the endless conveyor travelling therealong. After the filtering elements have been cleansed by means of the flexible rubber pipe or conduit 96, or by reversing the flow of the coolant liquid through the filtering elements 74 and 78, the control valves 67, 86, 92 and 95 may be restored to their initial position to cause circulation of the coolant liquid from the tank, through the filtering elements to the pump, and then through the pipe 89 to the spray nozzle of the machine tool (not shown).

In the modified form of the invention shown in Figures 6 to 8 inclusive, the coolant tank 105 comprises side walls 106 and 107 connected by suitable end walls as illustrated in Figures 1 to 5, 13 and 14, similarly, the coolant tank is provided with sloping bottom walls 111 which converge and form a trough for the endless conveyor indicated by the dotted line 113. The endless conveyor is identical in construction and operation with the pipe shown in Figures 1 to 5, 13 and 14 and is adapted to be driven in substantially the same manner to collect the sludge and other foreign matter in the trough formed by the sloping walls 111 so as to discharge said material to a remote point externally of the coolant tank.

In the modified form of the invention shown in Figures 6 to 8 inclusive, there is provided a coolant liquid circulating system similar to that shown in Figures 1 to 5, 13 and 14, including a rotary pump adapted to be driven by an electric motor and arranged with its intake connected to a pipe 114 and its exhaust connected to a pipe 115 which pipes correspond to the pipes 64 and 89 illustrated in Figures 1 to 3 inclusive. The intake pipe 114 is connected to a T-union or joint 116 having a pipe connection 117 adapted to be connected to the coolant tank 105 in the same manner as the pipe connection 66 and said pipe connection 117 is provided with a suitable control valve to regulate the flow of coolant liquid therethrough. Also connected to the T-union 116 is a pipe section 118 which has its end fitted in a suitable bushing 119 mounted in the side wall 106 of the coolant tank and extending through an opening therein so as to seal said pipe section 118 and securely hold the same in place. The other side of the coolant tank is provided with a short section of pipe 120 which has one end threaded in an elbow joint and its opposite end threaded in a sleeve 121. The elbow joint is connected to a vertical pipe (not shown) which has affixed to the upper end thereof a control valve 122 similar to the control valve 86 in Figures 1 to 5 inclusive. Similarly, the projecting end of the pipe 118 is fitted with a threaded sleeve 123 in opposed and aligned relation with the threaded sleeve 121.

Mounted between the pipes 118 and 120 is a manifold pipe 124 which has its ends flanged for engaging the threaded sleeves 121 and 123 and said flanged ends are adapted to be held in place by gland nuts 126 to provide swivel connections or couplings at each end of the manifold pipe 124. Interposed in the manifold pipe 124 and spaced equidistantly is a series of T-unions 127 which have secured thereto short pipe sections 128 for being coupled to parallel pipes 129 by suitable pipe couplings or the like 130. The parallel pipes 129 are connected to elbows 131 at the ends thereof in which are threaded the ends of the connecting pipe 132.

Interposed in the parallel pipes 129 is a series of T-joints 133 which have their lateral coupling boss 135 provided with a short section of pipe 136 upon which is adapted to be supported a filtering element generally indicated by the reference character 137.

Since all of the filtering elements 137 are the same in construction and arrangement, a description of one will suffice for all and as illustrated in Figures 7 and 8, the filtering element includes a pair of star-shaped supporting members 138 and 139 arranged in opposed relation with the reticulated filtering screen extending therebetween. The star-shaped supporting element 139 is provided with an annular flange 140 which is suitably threaded or otherwise fastened in place on the upper end of the short pipe section 136 so as to be retained in place by a locking nut or the like as at 141. The star-shaped supporting elements 138 and 139 are imbedded in plastic end plates 142 and 143 and the reticulated filtering screen 144 has its ends imbedded in the plastic end plates 142 and 143 so as to provide a cylindrical type filtering element having zigzag courses 145 between which project the pointed portions of the star-shaped supporting plates 138 and 139 as illustrated in Figure 7. A cover cap 146 is affixed to the plastic supporting plate 142 by means of a bolt 147 which extends through a central opening in the star-shaped supporting plate 138 and said cover cap has its peripheral edge as at 148 return bent over the peripheral edge of the plastic supporting plate 142. Similarly, a bottom cap 149 is held in place by the anchoring nut 141 and has its peripheral edge 150 return bent and extending above the peripheral edge of the plastic supporting plate 143.

The pipe 115 which is connected to the exhaust fluid pump is provided with a T-union 151 having a connection 152 with the control valve 122 and a connection 153 with the control valve 154. A pipe fitting or coupling nipple 155 is connected to the control valve 154 for facilitating the connection of a flexible pipe or tubing to the spray nozzle of the machine tool being supplied with coolant liquid. Also, the pipe 115 may have connected thereto a flexible rubber hose similar to the hose 96 shown in Figures 1 to 5 inclusive for cleaning the external surfaces of the filtering element 137 and a series of brackets 156 is provided on the side walls 106 and 107 of the coolant tank for supporting said flexible hose or tube when not in use. It will thus be seen that the manifold pipe 124 is mounted to swing or swivel between the gland or swivel nuts 126 so that the parallel pipes 129 and filtering element 137 will be swung vertically on a horizontal axis so as to be moved to a point of vantage for being repaired, replaced or cleaned. The free ends of the parallel pipes 129 may be supported in a similar manner to the filtering elements shown in Figures 1 to 5 and the control valve 158 may be interposed in the pipe section 118 to control the flow of fluid passing therethrough in substantially the same manner as the control valve 85 in Figures 1 to 5 inclusive.

The operation of the form of the invention shown in Figures 6 to 8 inclusive is substantially identical with the operation shown in Figures 1 to 5 inclusive. That is, the coolant liquid from the machine tool is discharged into the coolant tank 105 and the sludge therein settling in the trough or conveyor passageway 113 is collected and discharged by the endless conveyor 37, shown in Figures 1 to 5 inclusive, 13 and 14. In addition, the fluid is circulated by the rotary fluid pump so as to draw the coolant liquid from the tank through the filtering element 137 and thence through the pump to the point of use such as the machine tool as above described. When it is desired to clean the filtering element 137, the control valves 122, 154 and 158 are manipulated to reverse the flow of coolant fluid through the tank in the same manner as described in connection with Figures 1 to 5, 13 and 14, so as to force foreign matter and dirt adhering to the external surface of the reticulated filter screen 144 so as to dislodge said foreign matter and dirt and cause the same to fall to the bottom of the tank where it is collected and discharged by the conveyor. Obviously, a large number of filtering elements 137 may be employed for tanks having a greater capacity, and if desired, suitable valves may be interposed in the parallel pipes 129 to permit the elimination of certain filtering elements in accordance with the speed of circulation of the coolant liquid and the condition of the same when used for cooling the machine tool and work upon which it is operating.

Figures 8, 10:
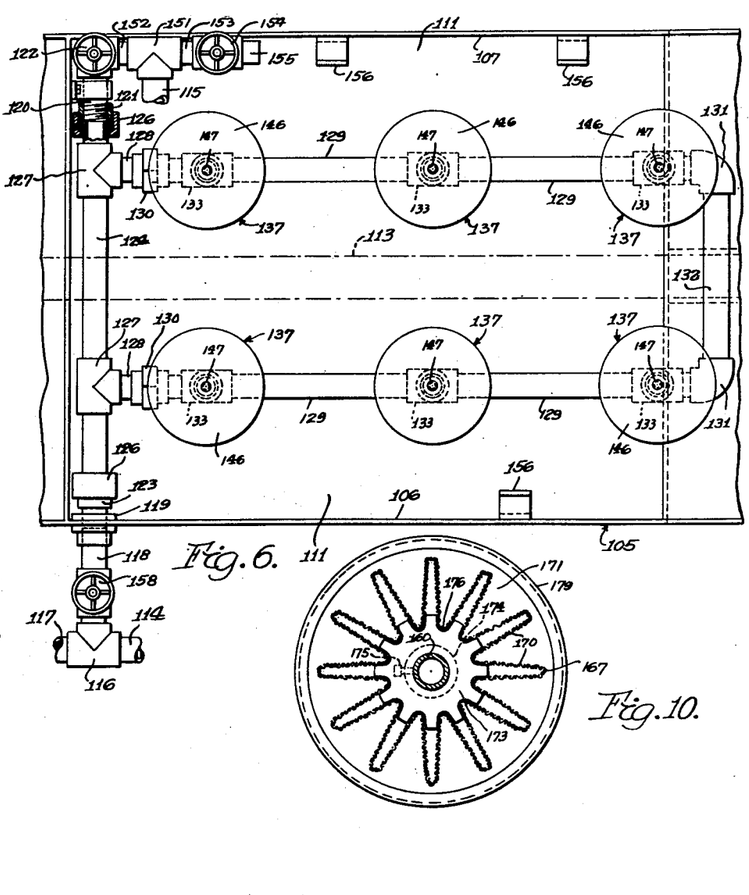
Figure 10 is a horizontal cross-sectional view taken on line 10—10 of Figure 9 looking in the direction of the arrows and illustrating various details of construction of the modified form of filter element shown in Figure 9.
Figure 9:
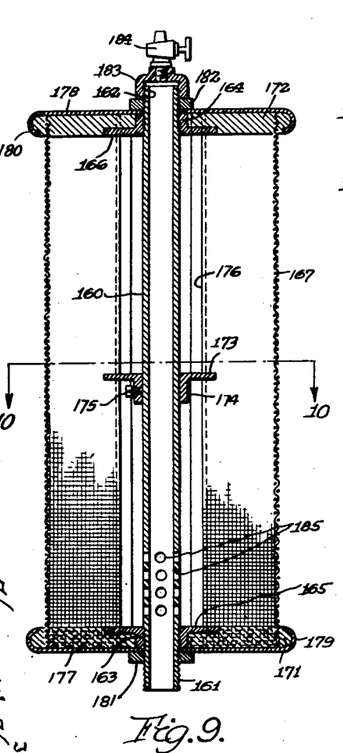
Figure 9 is a vertical sectional view of another form of filtering element to be used in connection with the modified form of the invention shown in Figure 6 where it is desired to employ a filtering element of a greater height to accommodate tanks of great depth.

In the modified form of the invention shown in Figures 9 and 10, a slightly different filtering element is shown and may be employed in lieu of the filtering elements 137 shown and described in Figures 6 to 8 inclusive, and as is the case in the description of the filtering element, 137, a single filtering element has been illustrated in detail in Figures 9 and 10.

In the filtering element shown in Figures 9 and 10, a vertical supporting pipe 160 is provided and has its lowermost end 161 threaded for a portion of its length for being received in a pipe union similar to the T-joint 133 shown in Figures 6 to 8 inclusive. The upper end of the supporting pipe 160 is similarly threaded as at 162 and said threaded sections 161 and 162 are adapted to receive the threaded hub portions 163 and 164 of star-shaped supporting plates 165 and 166 respectively which are similar in construction to the star-shaped supporting plates 138 and 139 shown in Figures 6 to 8 inclusive. The reticulated filtering screen 167 is arranged in zigzag fashion to conform to the shape of the points on the star-shaped supporting plates 165 and 166, so as to form radially extending walls 170, and the ends of the reticulated filtering screen 167 are received and imbedded in plastic end plates 171 and 172 during the forming thereof. Mounted on the supporting pipe 160 intermediate the ends thereof is a star-shaped supporting plate 173 which is provided with a collar 174 slidably mounted on said supporting pipe 160 and adjustably held in place by a set screw 175. The indentations in the star-shaped supporting plate 173 receive the bent intersecting portions of the radially extending walls 170 as at 176 so as to add rigidity to the reticulated filtering screen 167 and prevent the flexing and deformation thereof during use. Metal cap members 177 and 178 have their peripheral edges overturned or return bent as at 179 and 180 to extend over the peripheral edges of the plastic supporting plates 171 and 172 and thereby complete the construction. The end caps 177 and 178 are held in place by nuts 181 and 182 threaded on the respective threaded end portions 161 and 162 of the supporting pipe 160. Also threaded on the threaded portion 160 is a cap 183 which is provided with a suitable pet cock 184 to regulate the flow of coolant liquid through the filtering element. The lower portion of the supporting pipe 160 is provided with a series of apertures 185 to permit the passage of coolant liquid therethrough when the filtering element is connected in a filtering system as described in connection with the form of the invention shown in Figures 6 to 8 inclusive.

In the modified form of the invention shown in Figures 11 and 12, the coolant tank is slightly different in construction as well as the arrangement of the sludge removal conveyor. As shown in Figures 11 and 12, the coolant tank generally indicated by the reference character 190 comprises a pair of side walls 191 connected at one of their ends by an end wall 192. A pair of sloping bottom walls 193 connect the side walls 191 for a portion of their length and said sloping walls converge on a central trough 194 for receiving and facilitating the collection of sludge and sediment settling in the bottom of the tank. The sloping bottom walls 193 are bent at their point of convergence as at 195 to form sloping bottom walls arranged on an incline which converge in an inclined trough 196. The inclined sloping walls have their edges welded or otherwise secured to the side walls 191 of the tank as indicated in Figure 12.

Mounted within the coolant tank 190 is a conveyor conduit of tubular construction having a portion as at 197 extending parallel with the trough 194 and the remaining portion thereof inclined as at 198 and extending parallel to the trough formed by the point of convergence of the inclined sloping bottom walls 196. The relatively spaced and horizontal conveyor conduit portion 197 extends through an opening in the end wall 192 of the coolant tank 190 and is welded or otherwise secured thereto to prevent the escape of liquid therebetween, and the end of said relatively horizontal conduit portion 197 projects externally of the coolant tank and is provided with a return bent portion 199 which has its end as at 200 received in an opening in the end wall 192 directly below the opening through which the relatively straight tubular conduit portion 197 projects. The end 200 of the return bent section 199 may be welded or otherwise affixed in place so as to register with the trough 194 of the converging sloping bottom walls 193. The upper end of the inclined tubular conduit portion 198 is provided with a flared mouth portion 201 and secured thereto by means of welding or the like is a supporting plate 202 which is also affixed to the projecting upper end portion 203 of the trough 196 formed by the inclined converging sloping bottom walls.

A motor supporting bracket 204 is adjustably secured to the coolant tank 190 for supporting an electric motor 205 which has its base adjustably secured to the supporting plate 204 by means of a slot and bolt connection 206. The armature shaft 207 of the motor 205 is provided with a sprocket wheel 208 over which is trained an endless sprocket chain 209 similar to the sprocket chain 37 described in connection with the form of the invention shown in Figures 1 to 5, 13 and 14. Conveyor flights 210 are mounted on the endless conveyor chain in identically the same manner as pointed out and described in Figures 1 to 5, 13 and 14, and said flights 210 are constructed of opposed flight discs having interposed therebetween rubber wear members 211. Each of the conveyor flights 210 is cut away in the same manner as described in connection with the conveyor flight 41 shown in Figures 1 to 5, 13 and 14 and indicated by the reference character 48 therein.

It will thus be seen that the endless conveyor, including the endless sprocket chain 209 and spaced conveyor flights 210 will be guided through the conveyor conduit sections 197 and 198 as well as the return bent portion 199, and in order to cause the lower course of said endless conveyor to travel in conformity to the troughs 194 and 196 formed by the sloping bottom walls of the coolant tank, a guide plate 212 has its upper edge welded as at 213 to the under side of the tubular conveyor conduit section 197 so as to depend therefrom, with the lower end provided with a guide strip 214 for being received in the cutaway portion of the conveyor flights 210 so as to engage the endless conveyor chain 209 and thereby hold the flights in position during their travel along the trough 194 formed by the inclined sloping bottom walls 193. The guide strip 212 is provided with an angular portion 215 which is inclined upwardly and is welded to the bottom portion of the inclined conveyor tube section 198, and said inclined portion is provided with a flanged lower edge surface 216 continuous with the flanged portion 214 so as to guide the conveyor flights 210 during their travel along the inclined trough 196 formed by the inclined sloping bottom walls of the coolant tank. The upper end 217 of the inclined portion of the guide strip 215 is welded to the supporting plate 202, as well as being welded to the upper projecting end portion of the inclined section 198 of the conveyor tube conduit. A collection chamber 218 is mounted between the side walls 191 of the coolant tank 190 to extend beneath the discharge portion 203 of the inclined trough 196, and said receptacle has its side walls inclined to permit the same to be positioned well within or between the side walls 191 of the coolant tank and conform to the sloping trough 196 of the converging inclined bottom walls of said tank.

It will thus be seen that the coolant tank 190 may be placed under the discharge of the machine tool so as to collect the cooling liquid therefrom so that the same will be received in said tank and the heavier foreign particles therein will settle to the trough 194 and be carried or moved to the endless conveyor flights 210.

The operation of the form of the invention shown in Figures 11 and 12 is substantially the same as pointed out in connection with the showing in Figures 1 to 5, 13 and 14, and said coolant tank 190 may also be provided with a filtering system of the type shown in Figures 1 to 5, 13 and 14, as well as Figures 6 to 10 inclusive.

Figures 15, 17, 18:
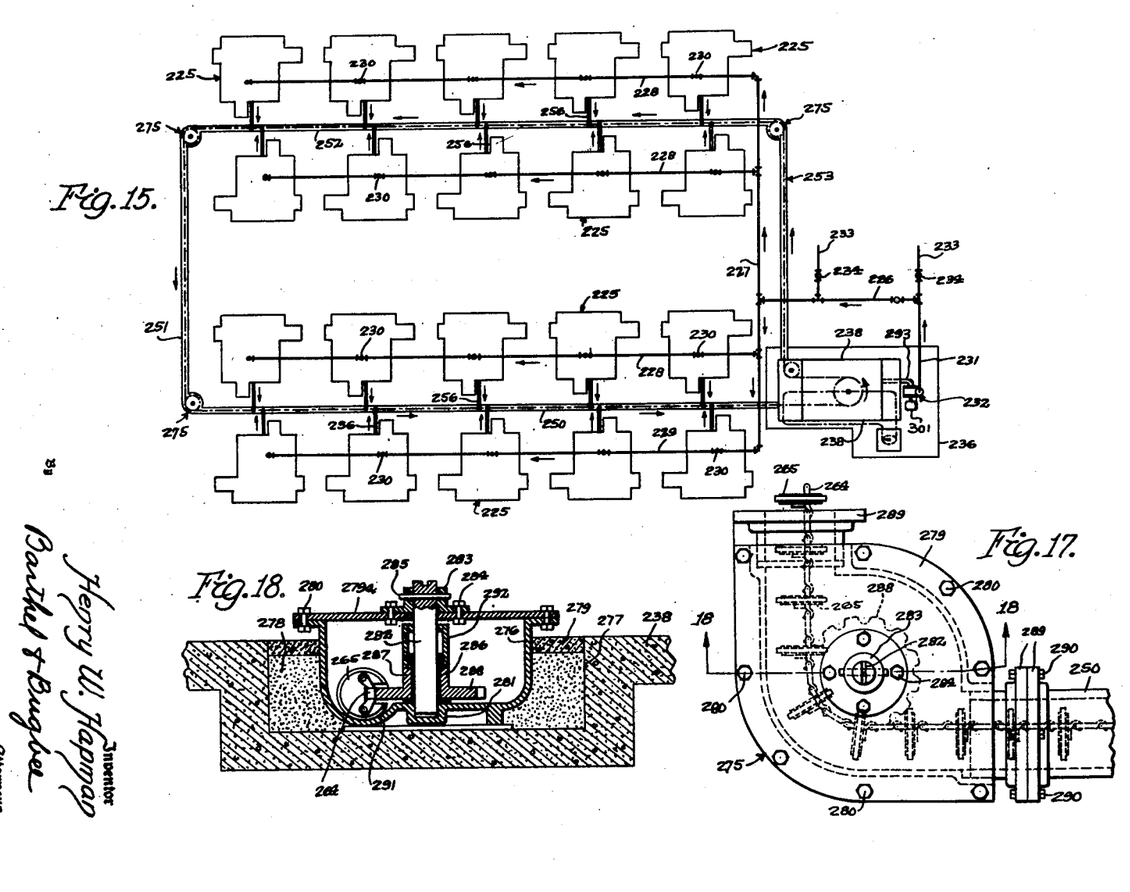
Figure 15 is a diagrammatic view of another modified form of the invention showing a coolant supply and sludge collection system for accommodating a plurality of machine tools.
Figure 17 is a top plan view of one of the sprockets or rollers interposed in the sludge collecting system for guiding the conveyor thereof about its circuitous pathway.
Figure 18 is a vertical cross-sectional view taken on line 18—18 of Figure 17, looking in the direction of the arrows and further showing the manner in which the sprocket or roller for guiding the conveyor is mounted in the floor of the plant.

In the modified form of the invention shown in Figures 15 to 19 inclusive, the coolant tank has been adapted to a system for accommodating a plurality of machine tools so as to feed cooling liquid thereto and permit the liquid after being used to be discharged into a common trough or conduit through which is passed an endless conveyor for aiding in conveying the liquid back to the coolant tank, as well as removing sediment therefrom which may become deposited on the walls of the conduit or trough. In industrial machine plants and factories employing a large number of machine tools, it is necessary to handle the cooling liquid in such a manner as to service all of the machine tools so as to save as much of the cooling liquid as possible, and as illustrated in Figure 15, a series of machine tools 225 are arranged in parallel rows spaced a sufficient distance to permit the operator of each machine tool freedom of movement in the execution of his duties and operation of the machine. The machine tools 225 such as lathes, grinders, shapers and other tools for metal, composition and fiber are supplied with a cooling medium through a feed pipe 226 which is connected to a manifold pipe 227 having a series of branch pipes 228 which extend above the machine tool 225 so that suitable connections may be had with the branch pipes 228 for directing a jet of cooling liquid over the surface of the work and machine tool during operation. Each of the branch pipes 228 is provided with a valve fitting 230 to interrupt the flow of cooling liquid to any one of the machine tools 225 which is out of operation for the purpose of repairs or otherwise. The feed pipe 226 is connected to a feed line 231 which is connected to the discharge or exhaust of a rotary fluid pump generally indicated by the reference character 232 and said feed pipe 226 is also provided with an additional pipe line 233 which may connect with other manifold pipes and branch pipes similar to the manifold and branch pipes 227 and 228 respectively. Suitable valves 234 are interposed in the additional pipe lines 233 to control the flow of liquid therethrough to other systems similar to the one shown.

Figure 16:
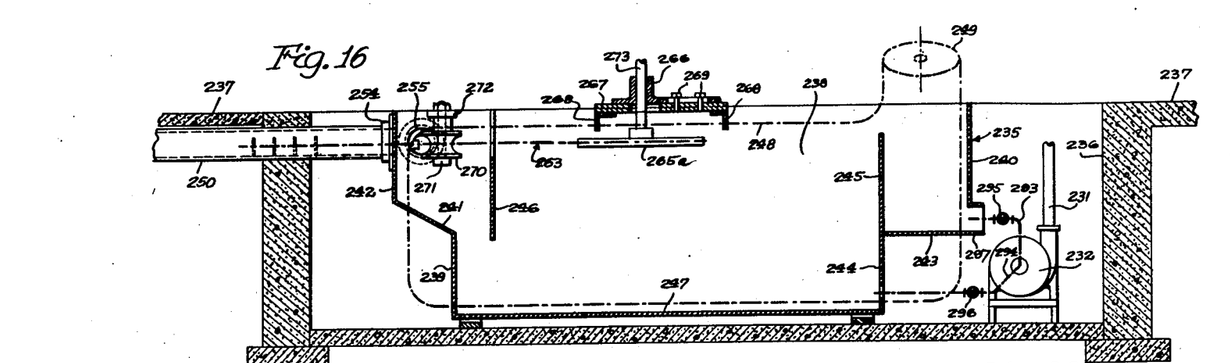
Figure 16 is a vertical cross-sectional view of the coolant tank and sludge removal and disposal means employed in the modified form of the invention shown in Figure 15 illustrating the manner in which the tank is mounted below the floor level to permit the gravity return of the coolant liquid from the machine tools.

The coolant liquid tank is generally indicated by the reference character 235 and is mounted below the floor level in a pit 236 formed in the floor 237 of the factory or plant in a location convenient and readily accessible to the machine tools 225.

The coolant tank 235 includes side walls 238 connected at the ends by suitable end walls 239 and 240 and the end wall 239 is offset and provided with a sloping portion 241 to form a collection chamber having a wall 242. The wall 240 likewise is offset by means of a horizontal wall portion 243 which connects with a vertical wall portion 244 as indicated in Figure 16, and said end wall 244 projects upwardly to form a division or baffle wall 245, and similarly, the baffle wall 246 is mounted at the opposite end of the coolant tank so as to prevent the material being discharged therein from being dispersed, and to direct the same downwardly toward the inclined sloping bottom walls of the tank, thereby forming a trough 247.

And endless conveyor 248 is mounted with respect to the coolant tank 235 so that a horizontal course thereof will traverse the trough-shaped bottom wall portion 247 and remove sludge therefrom. The conveyer 248 is constructed in a manner similar to the forms of the invention shown in Figures 1 to 12 inclusive, and is trained over the drive sprocket 249 which is drivingly connected to a suitable motor or other power source. The conveyor 248 may pass along the trough-shaped bottom portion 247 of the coolant tank and may pass out one end thereof so as to extend laterally and upwardly, and thence horizontally by means of suitable tubing, terminating at the sprocket wheel 249. Another section of conveyor tubing may then be passed downwardly at an inclined angle for attachment to the vertical wall 244 of the coolant tank in registry with an opening therein so that the endless conveyor and flight will traverse the trough-shaped bottom portion 247 and remove sludge therefrom as well as other foreign matter and particles.

Figure 19:
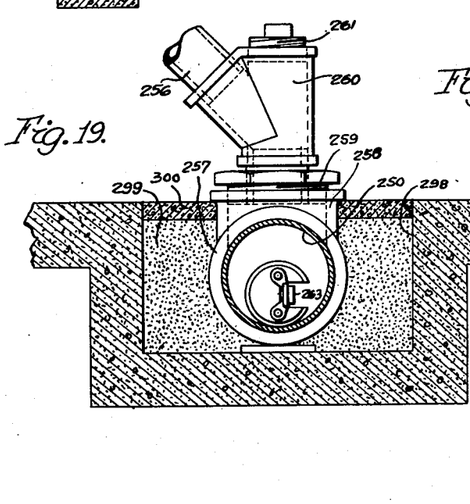
Figure 19 is a vertical cross-sectional view of a union connecting the machine discharge of one of the machine tools with the conveyor conduit.

In order to collect and return the coolant liquid from the machine tools 225, a conveyor conduit or trough 250 is imbedded in the floor 237 and extends between certain rows of machine tools 225 until reaching the end of said row where it is bent to form a straight line portion 251 for connection with another straight line portion 252 which extends between another pair of rows of machine tools 225 and is finally connected to the coolant tank 235 by means of a straight-line section 253. The conveyor conduits or troughs have their straight-line portions 250 and 253 connected to the coolant tank 235 by suitable couplings 254 and 255 extending through the end wall 242 and side walls 238 respectively, and the discharge pipe 256 from each machine tool 225 is connected to the conveyor conduit of one of the straight parallel sections 250 and 252 so that the coolant liquid discharged from the machine tools will flow by gravity to the conveyor conduit 250 or 252. At spaced intervals along the parallel conveyor conduits 250 and 252 there is provided a series of pipe couplings or unions 257 having laterally extending ported bosses 258 suitably threaded and machined for receiving the screw-threaded portion 259 of a Y-connection 260 (Figure 19). One of the passages of the Y-connection is adapted to be connected to the discharge pipe 256 while the other passage extends at right angles to the conveyor conduit 250 or 252 to facilitate the cleaning of said conduit at various intervals and the repair of the conveyor flights carried by the conveyor chains. The uppermost end of the Y-connection 260 is open and is adapted to be closed by a screw plug 261 which is readily accessible and easily removed for the purpose of gaining access to any of the conveyor parts of the endless conveyor.

The conveyor is generally indicated by the reference character 263 and said conveyor comprises an endless chain 264 having a series of conveyor flights 265 which are constructed in the same manner as the conveyor chain and flight shown in Figures 13 and 14.

A drive sprocket 265a (Figure 16) is provided for driving the endless conveyor 263 and is mounted in an adjustable bearing 266 on a suitable platform 267 supported by angle bars or brackets 268 extending between the side walls of the coolant tank 238. The adjustable bearing 266 is held in place by bolts or the like 269 which extend through the slotted opening in said adjustable bearing and have their ends threaded or otherwise secured in the platform 267. In order to guide the endless conveyor 263 as it passes from the coolant tank through the bushing 255, a guide pulley 270 is supported on a short spindle 271 arranged and supported by a bracket arm 272 secured to one of the side walls 238 of the coolant tank 235 so that the groove of the roller 270 will be in alignment with the conveyor passageway 253. The conveyor 263 enters the coolant tank through the bushing 254 which is tangentially aligned with the periphery of the drive sprocket 265a so that said sprocket may drive the conveyor 263 when power is applied to the shaft 273 thereof by means of an electric motor or other source of power.

In order to guide the conveyor 263 in such a manner as to negotiate the turn between the parallel portions 250 and 252, guide pulleys 275 are arranged at proper locations so that the conveyor will travel a course extending between as many pairs of rows of machine tools as may be desired. The pulley means 275 includes a sector-shaped casing 276 (Figures 17 and 18) which is located in a floor recess 277 in the floor 238 and sealed therein by suitable packing material covered by a relatively thin layer of concrete or the like 279a. The pulley housing 276 is provided with a removable cover 279 fastened in place by bolts or the like as at 280, and the floor of the pulley housing 276 is provided with a bearing boss 281 for receiving the lower end of a shaft 282. The upper end of the shaft 282 is secured to a bushing 283 affixed to the cover or top wall 279 by bolts or the like as at 284 and a locking pin 285 extends through the shaft 282 and bushing 283 to prevent relative rotation thereof. Mounted on the shaft 282 is a bushing 286 to provide a bearing surface for the hub 287 of a sprocket or pulley wheel 288 which is adapted to drive the conveyor chain 264 and extend into the opening of the conveyor flights (Figs. 17 and 18) in substantially the same manner as described in connection with the form of the invention shown in Figs. 1 to 5, 13 and 14. The straight-line portions of the conveyor conduit are connected to the pulley housing 276 by complementary flanges 289 which are bolted together by suitable circumferentially spaced anchoring bolts 290. The bottom wall of the pulley housing is shaped to form a conveyor trough 291 extending from the inlet thereof to the outlet in an arc about the pulley or sprocket wheel 288 so that the level of the coolant liquid will be maintained below the sprocket wheels 288 when the conveyor 264 is operated, preferably at a speed such that the coolant liquid level will not be elevated during operation. In order to protect the bushing 286 and shaft 282 against the action of abrasive material, a cover sleeve 292 encircles a portion of the shaft 282 and is slidably fitted over a reduced portion of the hub 287. It is to be understood that the pulley means 275 for guiding the endless conveyor in its circuitous pathway are identical in construction and so a description of one as pointed out in Figures 17 and 18 will suffice for all.

The intake of the feed pump 232 is provided with a pair of branch pipes 293 and 294 (Figure 16) which are connected to different portions of the coolant tank 235 and may alternately be used by operation of the control valves 295 and 296 respectively. The intake pipe 293 is connected to a pipe fitting or projection 297 in the end wall 240, and similarly, the intake pipe 294 may be connected to the lowermost portion of the tank by a similar fitting or connection secured to the wall 244 of said tank.

It is to be noted that the pipe unions 257 are mounted in the floor 238 of the industrial plant or factory in a manner similar to the pulley housing 276 and as shown in Figure 19, they are located in recesses or depressions 298 which are filled with packing material 299 and covered with a relatively thin layer of concrete or other plastic material as at 300. This arrangement and construction permits easy access to each pipe union to facilitate repair thereto in the same manner as pointed out in connection with the pulley or sprocket housing 276 in Figures 17 and 18.

An electric motor or the like as at 301 is provided for driving the rotary pump 232 and said motor may be mounted on the floor of the pit 233 in side by side relationship with the pump 232 so that the shaft thereof may be conveniently and drivingly connected to the motor.

If desired, the conveyor conduits or troughs 250 and 251, 252 and 253 may be inclined so as to induce the flow of coolant liquid to the coolant tank 235 by gravity. In the event that rectangular troughs are employed instead of circular or tubular conduits, the conveyor flights 265 may be formed of a suitable shape and size to conform to the cross sectional shape of said troughs so as to engage the walls thereof and facilitate the removal of sludge or other foreign matter collecting in said conveyor trough or conduit. In the present structure, as shown in Figures 15 to 19 inclusive, wherein the conveyor conduits or passageways 250, 251, 252 and 253 are level, a certain portion of the coolant liquid will drain back to the coolant tank 235 to seek a lower level therein due to the presence of liquid head pressure in the stand pipes 255 and the fact that the conveyor flights are of a smaller diameter than the diameter of the conveyor conduits or passageways 250, 251 and 252, 253.

Figures 20, 21:
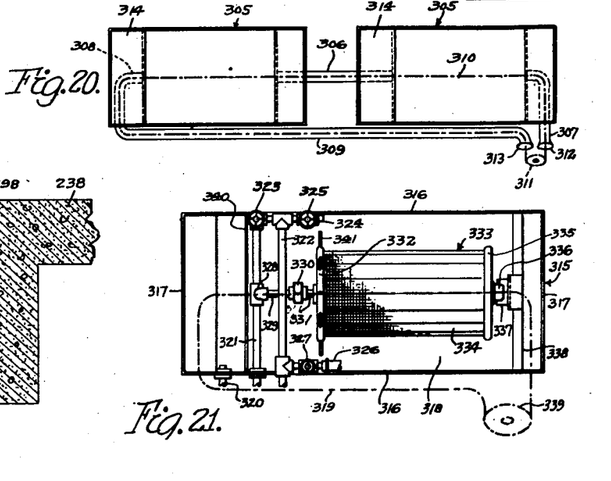
Figure 20 is a top plan view of another modified form of the invention showing two or more coolant tanks connected in series with the conveyor arranged to remove sludge therefrom.
Figure 21 is a top plan view of a still further modified form of the invention showing a slightly different filter construction and arrangement.

In the modified form of the invention shown in Figure 20, there is shown a pair of coolant tanks 305 which are coupled together and arranged so that the sludge removal conveyor is common to both. Obviously, two or more coolant tanks may be arranged in series as shown in Figure 20 with the coolant tanks having their adjacent ends connected by a short length of conveyor tubing or conduit 306 with the discharge conduit 307 secured to one end of one of the coolant tanks and the intake conduit 308 secured to the opposite end of the adjacent tank. This structure necessitates the use of a relatively long conveyor conduit section 309 so that the endless conveyor 310 and the flights thereon may pass over a sprocket wheel 311 located adjacent the flared ends 312 and 313 of the respective conveyor conduits 307 and 309. The conveyor 310 is of the endless chain type in the form of the invention shown in Figures 1 to 5, 13 and 14, and the conveyor flights are likewise of the same construction.

When employing a series of coolant tanks as at 305, the intake hopper of each tank as at 314 may be placed beneath the discharge tube or conduit of the machine tool so as to collect the coolant liquid as the same is discharged therefrom. If desired, the conveyor conduits 306, 307 and 308 may be provided at their ends with suitable threaded coupling members for detachable connection with the respective end walls of the coolant tank 305 to permit a number of coolant tanks to be assembled to accommodate the various a conditions of use and in particular, in such cases where there are a large number of machine tools to be supplied with a coolant liquid circulating system.

In the modified form of the invention shown in Figure 21, the coolant tank, generally indicated by the reference character 315 is composed of side walls 316 having end walls 317 and a bottom wall 318 having converging or sloping sections to form a trough for an endless conveyor 319 similar to the endless conveyor described in the form of the invention shown in Figures 1 to 5, 13 and 14. A fluid circulating pump is provided for the coolant tank shown in Figure 21, and said pump has its intake connected to pipes 320 and 321 in substantially the same fashion as the pipes 66 and 69 shown in the form of the invention in Figures 1 to 5, 13 and 14. The discharge side of the rotary pump is connected to a pipe line 322 and said pipe line is connected to the pipe 321 through the medium of a control valve 323, and to a discharge nipple 324 by means of a control valve 325. In addition, a rubber cleaning hose 326 is coupled to the discharge pipe 322 so that upon closing of the valves 323 and 325 and the opening of the valve 327, fluid under pressure may be forced through the flexible hose 326 for the purpose of washing the external surface of the filtering element mounted in the tank.

Interposed in the pipe 321 is a union or coupling 328 to which is secured a short length of pipe 329 having a swivel coupling on the end thereof as at 330. The swivel coupling is provided with a short length of pipe 331 which is connected to the header 332 of a rotary filtering element 333 which is formed with a zigzag peripheral surface in much the same manner as the filtering elements shown in Figures 6 to 10 inclusive. That is to say, the reticulated screening 334 has its ends imbedded in the header 332 and a similar header 335 with a central supporting pipe extending therebetween to hold the reticulated screening or fabric 334 in its pre-shaped position.

During operation of the coolant tank shown in Figure 21, the fluid is pumped from the tank through the filtering element and thence through the short pipe 329 to the intake of the pump through the pipe 321 when it is discharged through the pipe 322 to the machine tool by way of the discharge nipple 324. The free end of the filter is supported by means of a projection 336 formed on the end header 335 which is adapted to rest upon a supporting shelf or leg 337 carried by the supporting bar 338 connecting the side walls 316 of the coolant tank 315.

The conveyor or sludge collector 319 is driven by an electric motor which is drivingly connected to a sprocket wheel 339 in the same manner as pointed out in connection with Figures 1 to 5, 13 and 14, and said coolant tank is provided with a baffle wall 340 adjacent one end to form and provide an inlet chamber into which the coolant liquid is discharged from the machine tool. In order to manually rotate the filtering element 333 periodically, a series of handles 341 is provided on the header 332 so that the entire filtering element may be rotated on a swivel 330 by simply rotating the header 332 a slight angular distance to position new filtering surfaces to the coolant liquid being filtered and recirculated. In addition, the filtering element 33 may be swung vertically on the union 328 as a pivot point in the same manner as pointed out in connection with the form of the invention shown in Figures 6 to 8 inclusive.

It is to be noted that the collection tank and conveyor systems above disclosed and described can be used advantageously for handling dry material of a pulverant nature such as lamp black, fly ash, sugar, starches and siliceous material.

It is to be understood that the forms of the invention herewith shown and described are to be taken as preferred embodiments of the same, and that various changes may be made in the shape, size and arrangement of parts without departing from the spirit of the invention or the scope of the subjoined claims.

What I claim is:

1. In a liquid separation and purification system, a plurality of liquid collection and deposit tanks arranged side by side, sediment troughs formed in said tanks, a conveyor conduit connecting the adjacent ends of said tanks and arranged in alignment with said sediment troughs, conveyor conduits connected to the remote ends of said tanks and with their outer ends extending to a common location outside said tanks, an endless flight conveyor arranged in said conveyor conduits to traverse the sediment trough of said tanks, and a conveyor driving wheel mounted at said common location and drivingly engaging said flight conveyor.

2. In a liquid separation and purification system, a plurality of liquid collection and deposit tanks arranged side by side, sediment troughs formed in said tanks, a conveyor conduit connecting the adjacent ends of said tanks and arranged in alignment with said sediment troughs, conveyor conduits connected to the remote ends of said tanks and with their outer ends extending to a common location outside said tanks, an endless flight conveyor arranged in said conveyor conduits to traverse the sediment trough of said tanks, and a conveyor driving wheel mounted at said common location and drivingly engaging said flight conveyor, said wheel being located adjacent the discharge location of said conveyor conduits.

3. In a liquid separation and purification system, a plurality of liquid collection and deposit tanks arranged side by side, sediment troughs formed in said tanks, a conveyor conduit connecting the adjacent ends of said tanks and arranged in alignment with one of said sediment troughs, an endless flight conveyor arranged in both of said tanks and conveyor conduit to traverse the sediment trough of at least one of said tanks, and a conveyor driving wheel drivingly engaging said flight conveyor to move said flight conveyor through both of said tanks.

HENRY W. HAPMAN.

REFERENCES CITED

The following references are of record in the file of this patent:

UNITED STATES PATENTS

| Number | Name | Date |
|---|---|---|
| 217,442 | Belcher | July 15, 1879 |
| 373,257 | Waespi et al. | Nov. 15, 1887 |
| 385,666 | Hadley | July 3, 1888 |
| 1,404,873 | McGee | Jan. 31, 1922 |
| 1,422,514 | Arbuckle | July 11, 1922 |
| 1,530,077 | Haynes | Mar. 17, 1925 |
| 1,624,385 | Bergen | Apr. 12, 1927 |
| 1,716,228 | Horne | June 4, 1929 |
| 1,754,667 | Cabrera | Apr. 15, 1930 |
| 1,762,593 | Schwarz | June 10, 1930 |
| 1,870,381 | Piper | Aug. 9, 1932 |
| 2,081,198 | Hahn | May 25, 1937 |
| 2,110,204 | Davis | Mar. 8, 1938 |
| 2,178,341 | Hapman | Oct. 31, 1939 |
| 2,210,362 | Devenish | Aug. 6, 1940 |
| 2,216,693 | Monroe | Oct. 1, 1940 |
| 2,221,210 | Soderquist | Nov. 12, 1940 |
| 2,235,991 | Hapman | Mar. 25, 1941 |
| 2,279,423 | Vokes | Apr. 14, 1942 |
| 2,347,927 | Paterson | May 2, 1944 |
| 2,357,796 | Hapman | Sept. 12, 1944 |
| 2,432,756 | Hapman | Dec. 16, 1947 |

FOREIGN PATENTS

| Number | Country | Date |
|---|---|---|
| 1,327 | Great Britain | 1911 |
| 266,719 | Great Britain | Aug. 25, 1927 |
| 494,565 | Great Britain | Oct. 27, 1938 |
| 526,842 | France | July 9, 1921 |